(12) United States Patent
Chen

(10) Patent No.: US 10,914,237 B2
(45) Date of Patent: *Feb. 9, 2021

(54) AIRBLAST INJECTOR FOR A GAS TURBINE ENGINE

(71) Applicant: DYC TURBINES, LLC, San Diego, CA (US)

(72) Inventor: Daih-Yeou Chen, San Diego, CA (US)

(*) Notice: Subject to any disclaimer, the term of this patent is extended or adjusted under 35 U.S.C. 154(b) by 317 days.

This patent is subject to a terminal disclaimer.

(21) Appl. No.: 15/868,900

(22) Filed: Jan. 11, 2018

(65) Prior Publication Data

US 2018/0195439 A1    Jul. 12, 2018

Related U.S. Application Data

(62) Division of application No. 14/696,655, filed on Apr. 27, 2015, now Pat. No. 9,869,251.

(51) Int. Cl.
| | | |
|---|---|---|
| *F02C 7/236* | (2006.01) | |
| *F23R 3/12* | (2006.01) | |
| *F23R 3/14* | (2006.01) | |
| *F23D 11/06* | (2006.01) | |
| *F23R 3/28* | (2006.01) | |
| *F23D 11/04* | (2006.01) | |
| *F23D 11/08* | (2006.01) | |
| *F02C 7/26* | (2006.01) | |

(52) U.S. Cl.
CPC .............. *F02C 7/2365* (2013.01); *F02C 7/26* (2013.01); *F23D 11/04* (2013.01); *F23D 11/06* (2013.01); *F23D 11/08* (2013.01); *F23R 3/12* (2013.01); *F23R 3/14* (2013.01); *F23R 3/28* (2013.01); *F23D 2206/10* (2013.01); *F23D 2900/11101* (2013.01)

(58) Field of Classification Search
CPC .......... F02C 7/2365; F02C 7/057; F23R 3/04; F23R 3/12; F23R 3/14; F23R 3/28; F23R 3/34; F23R 3/286; F23R 3/30; F23D 11/04; F23D 11/06; F23D 11/08; F23D 2206/10; F23D 2399/11101; F23D 2900/14005; F23D 2900/11101
USPC ....... 239/382, 390, 392, 393, 403, 474, 475, 239/491; 60/740, 744, 745, 746; 431/168, 169, 156
See application file for complete search history.

(56) References Cited

U.S. PATENT DOCUMENTS

| | | | |
|---|---|---|---|
| 6,863,228 B2 * | 3/2005 | Mao ......................... | B05B 7/08 239/399 |
| 2013/0167544 A1 * | 7/2013 | Nickolaus ............... | F23R 3/286 60/772 |

* cited by examiner

*Primary Examiner* — Alex M Valvis
(74) *Attorney, Agent, or Firm* — Steven R. Vosen

(57) ABSTRACT

An airblast injector for gas turbines is disclosed. The airblast injector assembly consists of fuel swirler, a swirler cup, and a combustor dome. The airblast injector is designed to improve engine performance without using a fuel staging system to incorporate pressure injectors. The swirler cup is provided with pressurized air which exits the swirler cup with high velocity that penetrates perpendicularly into the fuel spray cone obtained by orifices in the fuel swirler.

7 Claims, 9 Drawing Sheets

AIRBLAST INJECTOR FOR A GAS TURBINE ENGINE

BACKGROUND OF THE INVENTION

Field of the Invention

The present invention relates in general to gas turbine engines. More particularly, the invention is directed to gas turbines employing airblast injectors.

Description of the Related Art

Airblast injectors may be employed in gas turbines to reduce NOx emissions and exhaust smoke. However, during engine start-up, the air pressure is not adequate to atomize fuel. Many conventional approaches require a fuel staging system to incorporate start injectors, such as pressure injectors, for engine starting in gas turbines. The pressure injectors often exhibit undesirable performance during start up and may cause torching, excessive smoke, and unburned fuels in the engine exhaust.

Accordingly, a need exists to provide an efficient means for starting gas turbines.

SUMMARY OF THE INVENTION

In the first aspect, an airblast injector assembly is disclosed. The airblast injector assembly comprises an electric motor having a rotating shaft, a compressor coupled to the rotating shaft, and an airblast injector. The airblast injector comprises a fuel swirler generating a fuel spray cone having a spray cone angle, a swirler cup having a plurality of air exiting orifices positioned annularly at a swirler location diameter, the air exiting orifices directing air generally perpendicularly into the fuel spray cone, the air exiting orifices having a down angle and a back angle.

In a first preferred embodiment, the airblast assembly further comprises a fuel swirler housing having an injector tip diameter, wherein the air exiting orifices are positioned downstream and away from the fuel swirler, wherein a ratio of the swirler location diameter to the injector tip diameter is in the range of approximately 1.5 to approximately 3.0. The airblast injector assembly preferably further comprises an outlet defining a fuel exiting orifice and a combustor dome, the outlet defining the fuel exiting orifice connecting the fuel swirler to the combustor dome, wherein the swirler cup is positioned above the combustor dome. The down angle of the air exiting orifices preferably is in the range of approximately 37.5 degrees to approximately 52.5 degrees. The back angle of the air exiting orifices is preferably in the range of approximately 0 degrees to approximately 75 degrees. The spray cone angle is preferably in the range of approximately 75 degrees to approximately 105 degrees. The electric motor coupled to the compressor preferably generates a controlled pressurized airflow to the plurality of air exiting orifices, which may be during turbine start-up. The electric motor preferably deactivates after start-up. The electric motor is preferably configured to control airflow injected into the swirler cup. The compressor preferably comprises an axial compressor. The compressor preferably comprises a radial compressor.

In a second aspect, an airblast injector assembly is disclosed. The airblast injector assembly comprises a fuel swirler generating a fuel spray cone having a spray cone angle, and a swirler cup having a plurality of air exiting orifices positioned annularly at a swirler location diameter, the air exiting orifices directing air generally perpendicularly into the fuel spray cone, the air exiting orifices having a down angle and a back angle.

In a second preferred embodiment the airblast assembly further comprises a fuel swirler housing having an injector tip diameter, the air exiting orifices are positioned downstream and away from the fuel swirler, wherein a ratio of the swirler location diameter to the injector tip diameter is in the range of approximately 1.5 to approximately 3.0. The airblast injector assembly preferably further comprises an outlet defining a fuel exiting orifice and a combustor dome, the outlet defining the fuel exiting orifice connecting the fuel swirler to the combustor dome, wherein the swirler cup is positioned above the combustor dome. The down angle is preferably in the range of approximately 37.5 degrees to approximately 52.5 degrees. The back angle is preferably in the range of approximately 0 degrees to approximately 75 degrees. The spray cone angle is preferably in the range of approximately 75 degrees to approximately 105 degrees.

In a third aspect, a method for controlling the mixture of fuel and air is disclosed. The method comprises providing a gas turbine employing an airblast injector assembly having an electric motor, a compressor coupled to the electric motor, and an airblast injector, providing a controlled flow of fuel to the airblast injector assembly, and controlling the rotational speed of the electric motor coupled to the compressor. Said controlling the rotational speed of the electric motor determines the airflow provided to the airblast injector.

In a third preferred embodiment, said controlling the rotational speed of the electric motor is performed throughout an operation of the gas turbine.

These and other features and advantages of the invention will become more apparent with a description of preferred embodiments in reference to the associated drawings.

DETAILED DESCRIPTION OF THE PREFERRED EMBODIMENTS

Figure 1:
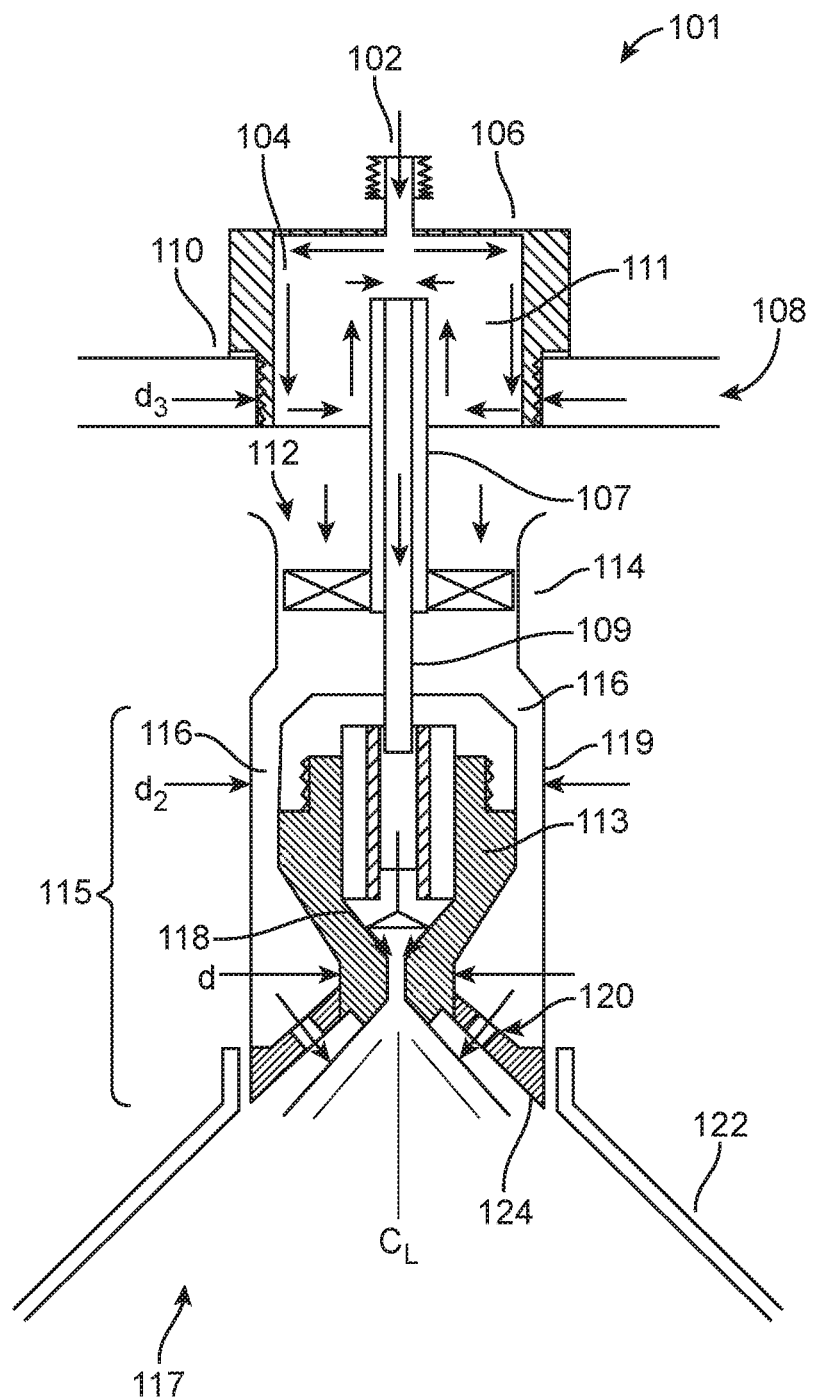
FIG. 1 is a schematic, cross-sectional view of an electric motor assisted airblast injector assembly with an axial compressor.

An electric motor assisted airblast injector design is disclosed that is capable of locally producing pressurized air to atomize fuel inside a gas turbine combustor. The motor assisted airblast injector assembly consists of an airblast injector, a high speed electric motor and a compressor.

The airblast injector is used extensively in gas turbines to reduce NOx emissions and exhaust smoke, owing to sufficient air pressure differential across the combustor is readily available during operation to produce high air velocity for atomizing fuel. However, the air pressure differential is not sufficient during starting for atomizing fuel and light-off/starting becomes extremely difficult. Therefore, a fuel staging system to incorporate start injectors, such as pressure injectors, is normally used for engine starting in gas turbines.

Pressure injectors require minimum fuel flow, which is always excessive or too rich for mixing with air available during starting, to produce sufficient fuel pressure differential to atomize fuel. The rich fuel/air mixture during starting will cause torching, excessive smoke and unburned fuels in the engine exhaust.

The motor assisted airblast injector is designed to improve engine light-off/starting reliability without using pressure injectors. A high speed electric motor is activated during starting to drive a compressor for locally producing pressurized air without sacrificing combustor performance. The amount of pressurized air through the compressor is also controlled by motor speed to match fuel starting schedule and produce fuel/air mixture within flammability limits, which leads to reliable starting without any starting problems including flameouts, exhaust torching, excessive smoke and unburned fuels.

After successful completion of engine starting, the high speed electric motor will be cut off and the motor assisted airblast injector becomes a normal airblast injector that uses sufficient air pressure differential available across the combustor, at no load or full load operating conditions, to produce high air velocity for atomizing fuel. High velocity air exiting orifices or vanes of the air swirler installed on the swirler cup penetrate perpendicularly into the thin sheets of fuel spray cone, obtained by discharging the fuel through the specially-designed orifices in the fuel swirler. Since the fuel flows at these conditions are higher, the airblast injector also uses sufficient fuel pressure differential available to atomize fuel. Hence, fuel atomization and fuel/air mixing are easily achieved using both air and fuel pressure differentials available at no load or full load operating conditions.

The recirculation flow pattern of fuel and air mixture inside the swirler cup can be optimized to meet combustor design need by varying air swirler location, air swirler down angle φ and air swirler back angle θ. The down angle φ and back angle θ are referred to the swirler reference line which is a perpendicular line to the thin sheets of fuel spray cone.

FIG. 1 is a schematic, cross-sectional view of an electric motor assisted airblast injector assembly 101. The electric motor assisted airblast injector assembly 101 is generally aligned along a centerline $C_L$ and has a high-speed electric motor 106 having a rotating shaft 107, an axial compressor 114 coupled to the rotating shaft 107, and an airblast injector 115. The airblast injector 115 comprises a fuel swirler housing 113 that holds a fuel swirler 118, an outer wall 119, and a swirler cup 124 having a plurality of air exiting orifices 120 positioned annularly at a swirler location diameter. Airflow channels 116 are formed between the fuel swirler housing 113 and the outer wall 119.

A fuel inlet 102 feeds fuel downstream to the fuel swirler housing 113 via fuel line 109. In one or more embodiments, the fuel line 109 is positioned coaxially within the rotating tubular shaft 107, where the fuel line 109 is not in physical contact with the rotating shaft 107 and remains stationary.

Figure 6:
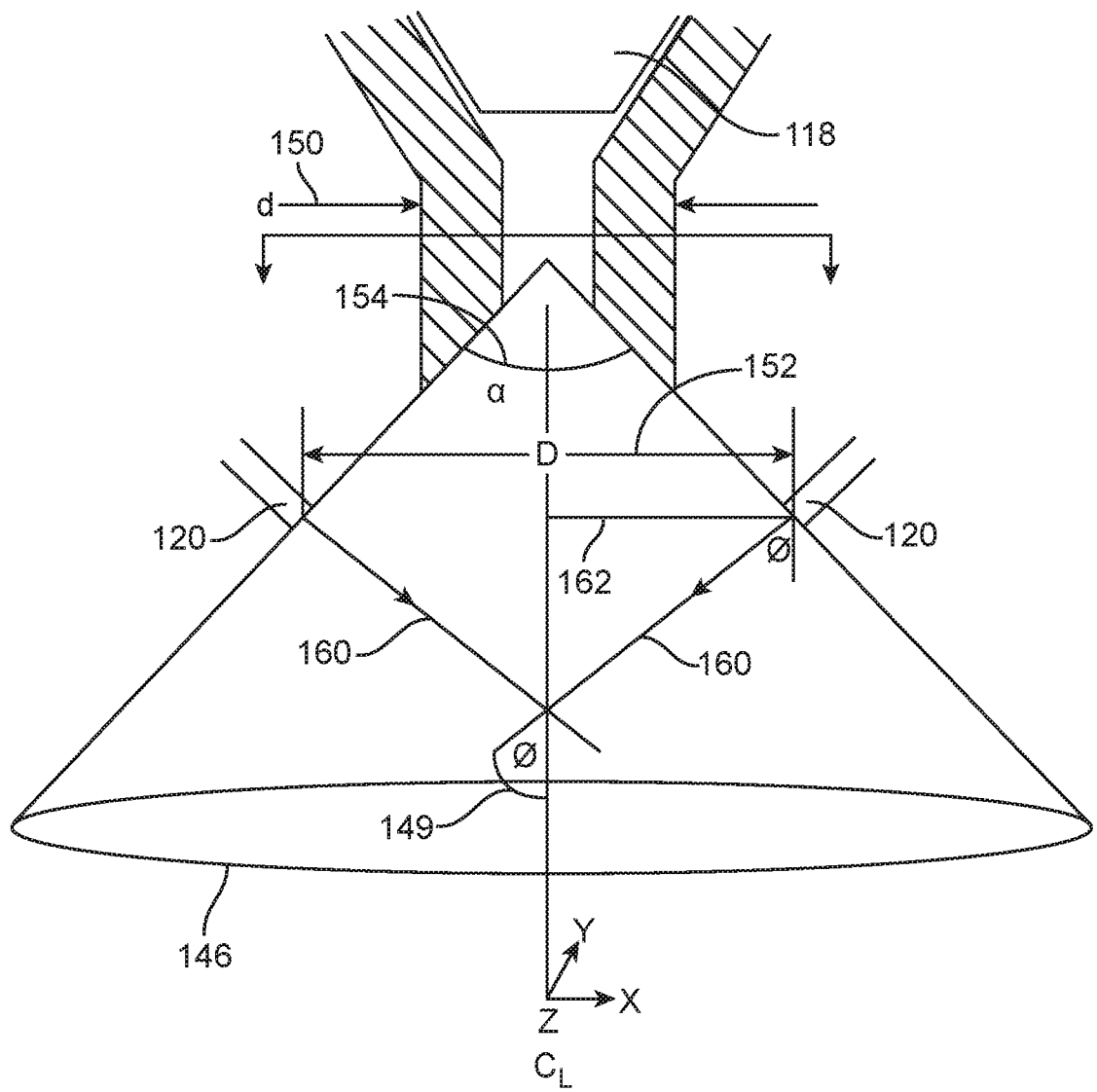
FIG. 6 is a side view of a diagram illustrating the spray cone angle, the location of the swirler cup, and the down angle.

The fuel swirler housing 113 holds and feeds fuel to the fuel swirler 118. In one or more embodiments, reference to fuel swirlers may refer to components having flow surfaces such as swirler vanes, swirler flanges, swirler cones, deflector flare assemblies, or venturi channels. The fuel swirler 118 provides a spin or swirl of fuel about the center axis $C_L$ in the combustor dome 117. The fuel swirler 118 is configured to generate a fuel spray cone in the combustor dome 117 having a spray cone angle a 154 as illustrated in FIG. 6 and discussed below. In one or more embodiments, the spray cone angle a 154 is in a range of approximately 75 degrees to approximately 105 degrees.

An energized electric motor 106 initiates air flow by rotating the axial compressor 114. The axial compressor 114 causes combustor air to be drawn in from the air input ports 112. The air traverses through the airflow channel 116, which is then fed to the air exiting orifices 120 directing air generally perpendicularly into the fuel spray cone. The air exiting orifices 120 are configured to have a down angle and a back angle, as discussed in greater detail below. In one or more embodiments, the down angle is in the range of approximately 37.5 degrees to approximately 52.5 degrees. In one or more embodiments, the back angle is in the range of approximately 0 degrees to approximately 75 degrees. As discussed below, the air exiting orifices 120 in the swirler cup 124 blast air tangentially into the thin sheets of fuel spray cone in the combustor dome area 117. The air exiting orifices 120 are configured to generate a spin or swirl pattern of the fuel and air mixture about the center axis $C_L$.

The combustor dome 117 has a combustor liner 122 for containing the combustion. The combustor dome 117 is conically shaped having a radius (measured from the centerline CO increasing downstream. The combustor dome 117 further facilitates the air and fuel mixing, which is ignited to produce hot combustion gases which may be used to drive a downstream turbine.

The electric motor 106 is coupled to the combustor case 108 via a gasket 110. In one or more embodiments, the axial compressor 114, the fuel swirler 118, the swirler cup 124, and the combustor liner 122 generally lies along an axial center axis centerline $C_L$.

As depicted in FIG. 1 and discussed in greater detail below, the fuel swirler housing 113 has a cylindrical portion immediately downstream of the fuel swirler 118 defining an injector tip diameter "d." The outer walls 119 have a diameter "$d_2$" and the upper opening of on the combustor case 108 has a diameter "$d_3$." In one or more embodiments, the diameter $d_2$ is less than diameter $d_3$ to facilitate positioning and assembly of the airblast injector 115 within the combustor case 108.

In one or more embodiments, the fuel is employed to cool the electric motor 106. As shown schematically, the electric motor 106 may have one or more internal/external chambers 104 through which the fuel may traverse. Heat generated by the electric motor 106 is transferred to the fuel, and the electric motor 106 is effectively cooled by the fuel.

The electric motor assisted airblast injector assembly 101 is designed to improve engine light-off and starting reliability without using fuel staging system to incorporate pressure injectors. A high speed electric motor 106 is activated during start up to drive a compressor 114 for locally producing pressurized air without sacrificing combustor performance. The amount of pressurized air through the compressor 114 is also controlled by motor speed to match fuel starting schedule and produce fuel and air mixture within flammability limits, which leads to reliable starting without any starting problems such as flame outs, exhaust torching, excessive smoke, and unburned fuels. The electric motor 106 coupled to the compressor 114 generates a controlled pressurized airstream to the plurality of air exiting orifices 120 during gas turbine start-up. In an embodiment, the electric motor 106 deactivates after start-up.

In one or more embodiments, the electric motor 106 may be employed during normal operation after engine start up. The speed of the electric motor 106 effectively determines the amount of air flow to the combustor dome 117, and is a means to control the ratio of fuel and air during operation.

Figure 2:
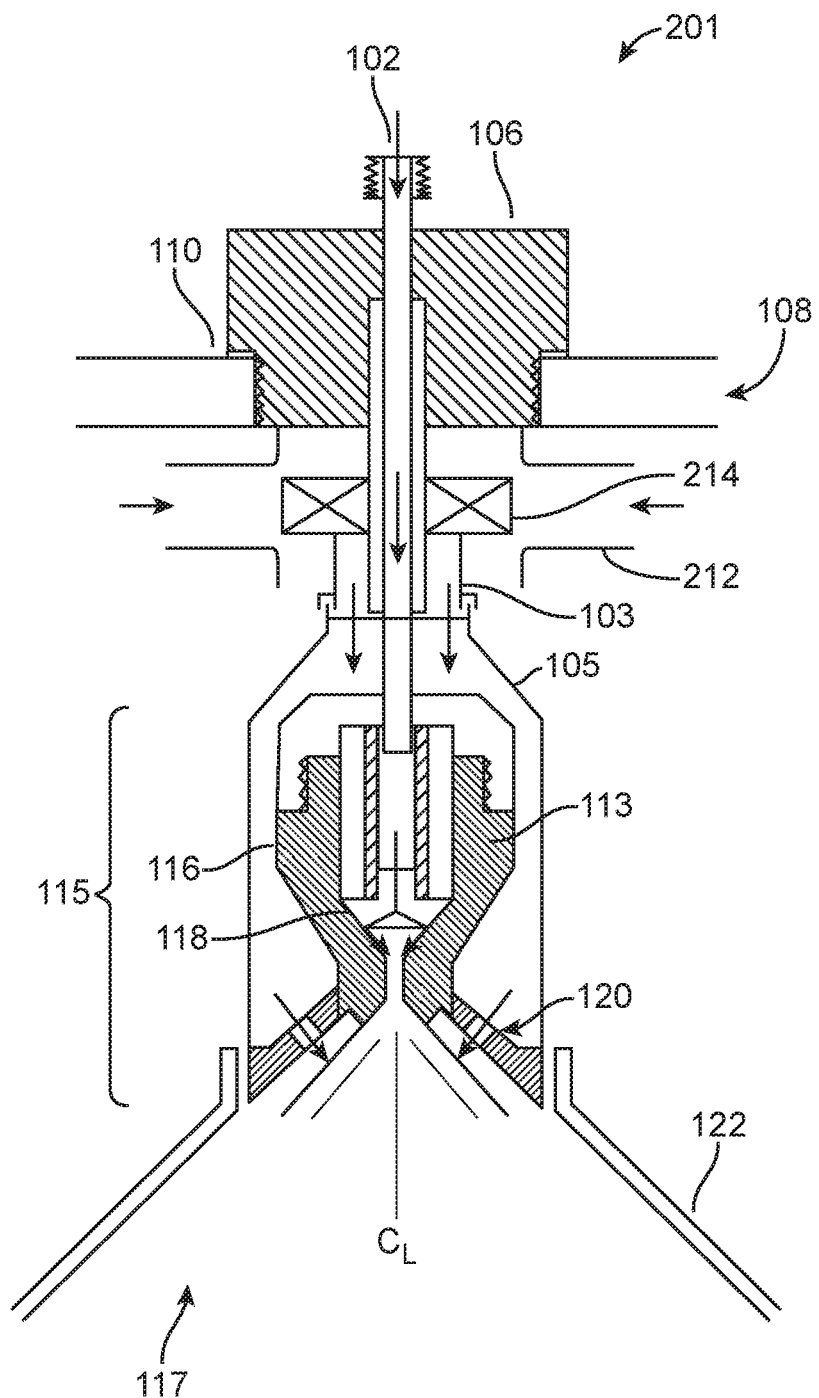
FIG. 2 is a schematic, cross-sectional view of an electric motor assisted airblast injector assembly with a radial compressor.

FIG. 2 is a schematic, cross-sectional view of an electric motor assisted airblast injector assembly 201 with a radial compressor 214 in an embodiment having similar features as the injector assembly 101 described above and depicted in FIG. 1. In an embodiment, a radial compressor 214 draws combustor air in radially with respect to the centerline $C_L$. In one or more embodiments, input ports 212 may optionally be employed to direct airflow. Compressor exit portion 103 rotates about centerline $C_L$ and compressor exit portion 105 remains stationary. Elements of similar structure as those in FIG. 1 are designated by the same reference numerals in FIG. 2.

Figure 3:
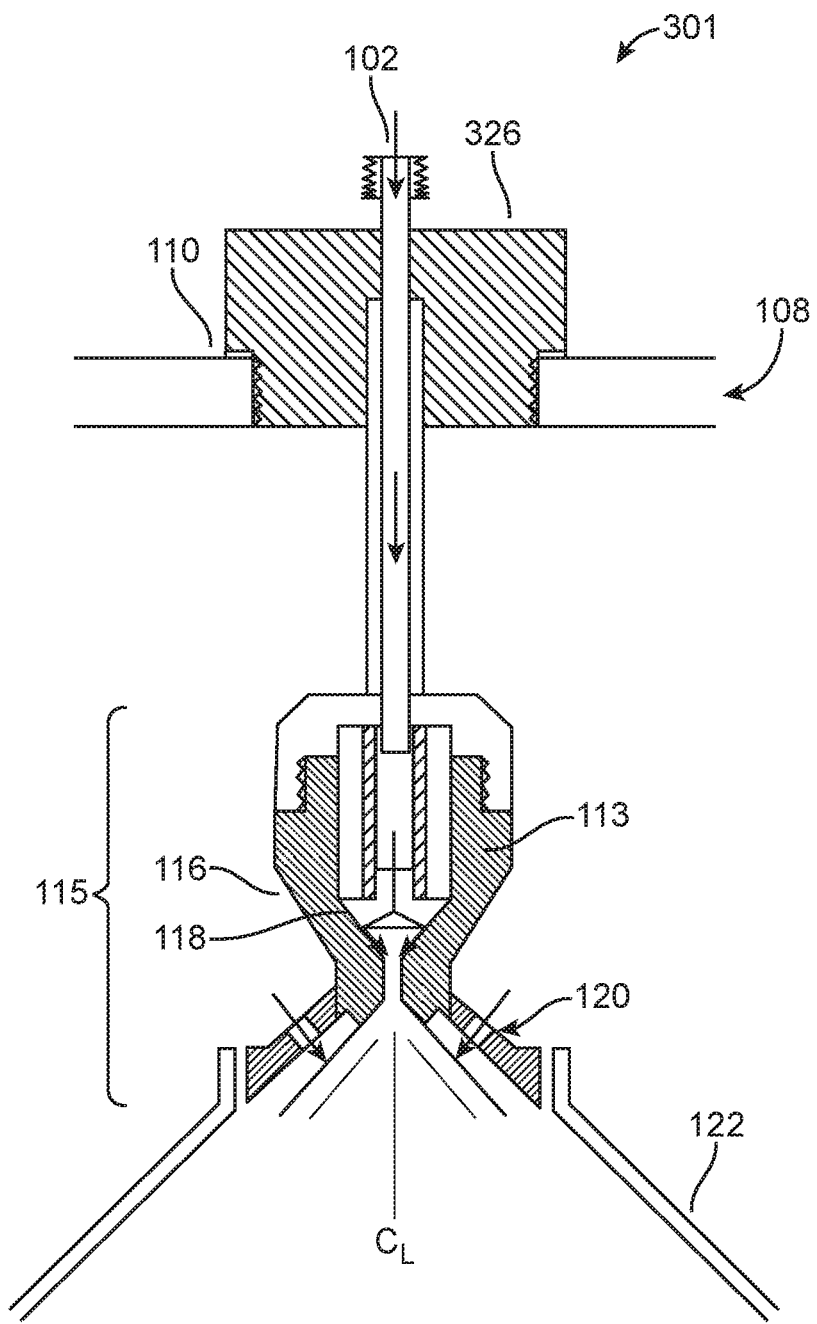
FIG. 3 is a schematic, cross-sectional view of an airblast injector assembly without a motor and compressor.

FIG. 3 is a schematic cross sectional view of an airblast injector assembly 301 without a motor and compressor. In one or more embodiments, an injector body 326 is placed on the combustor case 108. Without employing an electric motor (e.g., motor 106) or compressor (e.g., compressor 114 or 214), the injector body 326 provides the fuel to the airblast injector 115. Elements of similar structure as those in FIG. 1 are designated by the same reference numerals in FIG. 3.

In one or more embodiments, the airblast injector assembly 301 may represent the operation of the airblast injector assembly after engine start-up. For example, the airblast injector assemblies 101 and 201 may be employed for engine start up. After successful completion of engine starting, the high speed electric motor 106 may be cut off and the electric motor assisted airblast injector assembly 101 or 201 becomes a normal airblast injector assembly 301 that uses sufficient air pressure differential available across the combustor, at no load or full load operating conditions, to produce high air velocity for atomizing fuel. High velocity air exiting orifices or vanes of the air swirler installed on the swirler cup 124 penetrate perpendicularly into the thin sheets of spray cone obtained by discharging the fuel through the specially-designed orifices in the fuel swirler. Since the fuel flows at these conditions are higher, the airblast injector also uses sufficient fuel pressure differential available to atomize fuel. Hence, fuel atomization and fuel/air mixing are easily achieved using both air and fuel pressure differentials available at no load or full load operating conditions.

Figure 4:
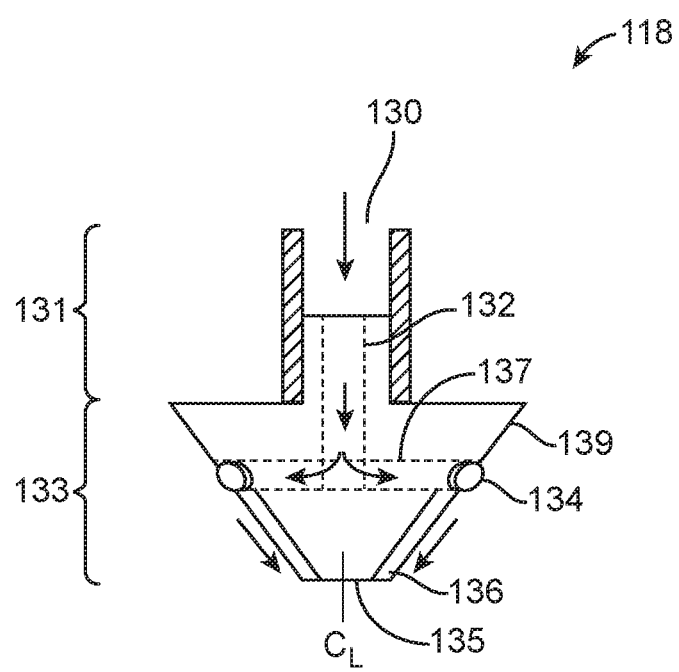
FIG. 4 is a schematic, cross-sectional view of a fuel swirler.
Figure 5:
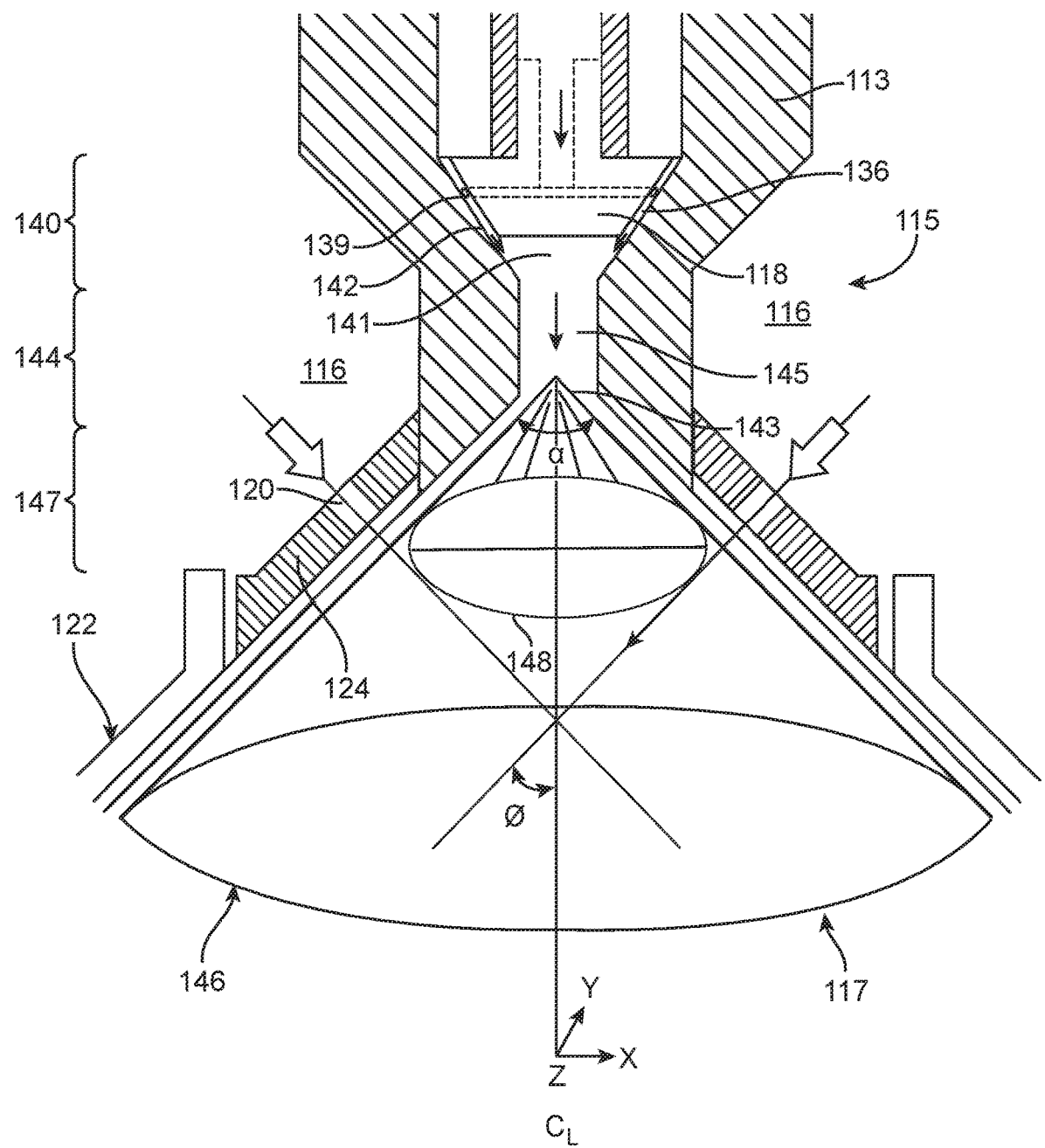
FIG. 5 is a schematic, cross-sectional view showing details of the airblast injector assembly and the combustor.

FIG. 4 is a schematic, cross-sectional view of the fuel swirler 118. The fuel swirler 118 comprises a conically-shaped member 133 coupled to a tubular inlet port 131 having a port 130 which couples to the fuel line 109. The conically-shaped member 133 has a fuel pathway 132 that lies along the centerline $C_L$ which then branches to a plurality of lateral pathways 137 which divert the fuel from the centerline $C_L$ to the holes 134 formed on the outer surface 139 of the conically-shaped member 133. A plurality of slots 136 are formed on the outer surface 139 from the holes 134 to the distal end 135 of the conically-shaped member 133. As shown in FIGS. 4 and 5, the fuel enters fuel swirler 118 at port 130, and is fed through the fuel pathway 132, which diverts the fuel laterally through lateral pathways 137 to exit at holes 134. The fuel swirler 118 may be placed in a conically shaped housing 140 having an internal wall 142 inversely shaped to that of the conically-shaped member 133, which forces the fuel to follow the pathways defined by slots 136.

As shown in FIG. 5, the fuel swirler housing 113 has a conical section 140 connected to a downstream tubular section 144 having an outlet 145 defining a fuel exiting orifice 143, which leads to the fuel and air injection section 147 in the combustor dome 117. Hence, after the fuel exits the slots 136, the fuel enters the swirl chamber 141 and then the outlet 145 defining a fuel exiting orifice 143 before being injected into the combustor dome 117. The fuel swirler 118, the swirl chamber 141, and the outlet 145 defining a fuel exiting orifice 143 are configured to generate swirled fuel spray cones 146 and 148, having a spray cone angle 154 α.

Fuel and air mixture are carried into the combustor dome 117 via the air exiting orifices 120 in the swirler cup 124. The air exiting orifices 120 are positioned downstream and away from the exit of outlet defining a fuel exiting orifice 143. As illustrated in FIG. 6, the cylindrical portion of the fuel swirler housing 113 has an outer diameter 150 "d" and the diameter 152 "D" formed by the positioning of the air exit orifices 120 in the swirler cup 124. In one or more embodiments, the ratio of the swirler location diameter 152 "D" to the injector tip diameter 150 "d" is in the range of approximately 1.5 to approximately 3.0.

Air injected into the combustor is generally directed along pathways designated by the swirler reference lines 160. The air exiting orifices are formed having a down angle φ 149 and a back angle θ 164. The down angle φ 149 and back angle θ 164 are referred to the swirler reference line, which is a perpendicular line to the thin sheets of spray cone 146. The air exiting orifices direct air generally perpendicularly into the fuel spray cone 146.

FIG. 6 is a side view of a diagram illustrating the spray cone angle a 154, the location of the swirler cup, and the down angle φ 149. The down angle φ 149 is measured from the downstream direction along the centerline $C_L$ and is the angle formed between centerline $C_L$ and the swirler reference lines 160 (i.e., the direction of the air being injected into the combustor dome 117).

Figure 7:
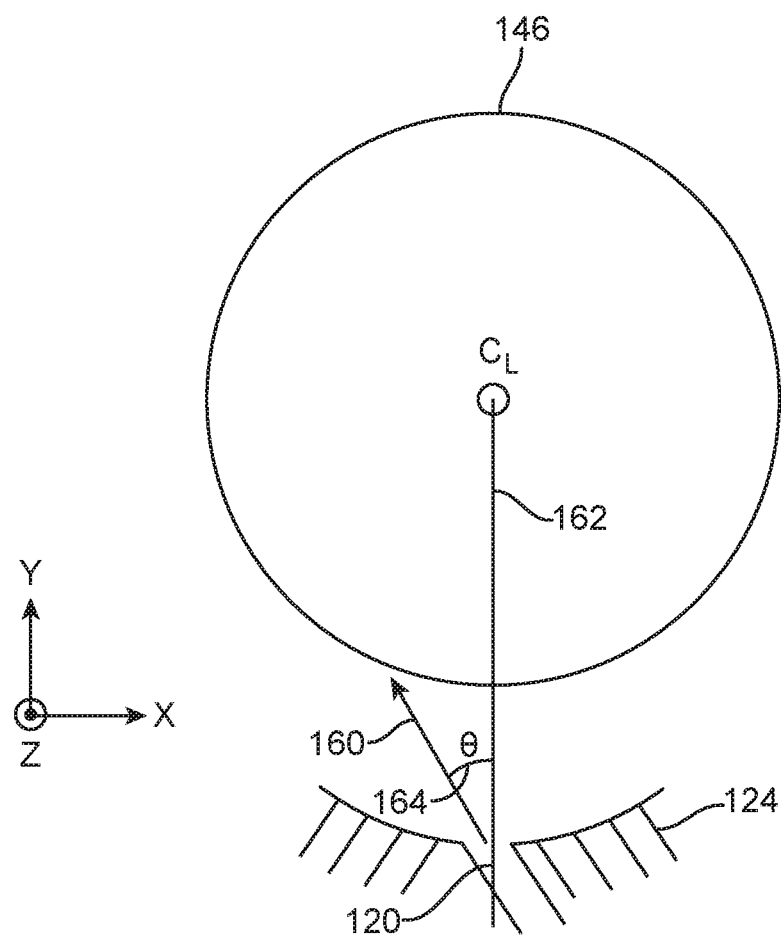
FIG. 7 is a top view of a diagram illustrating the back angle of the air exit orifice.
Figure 8:
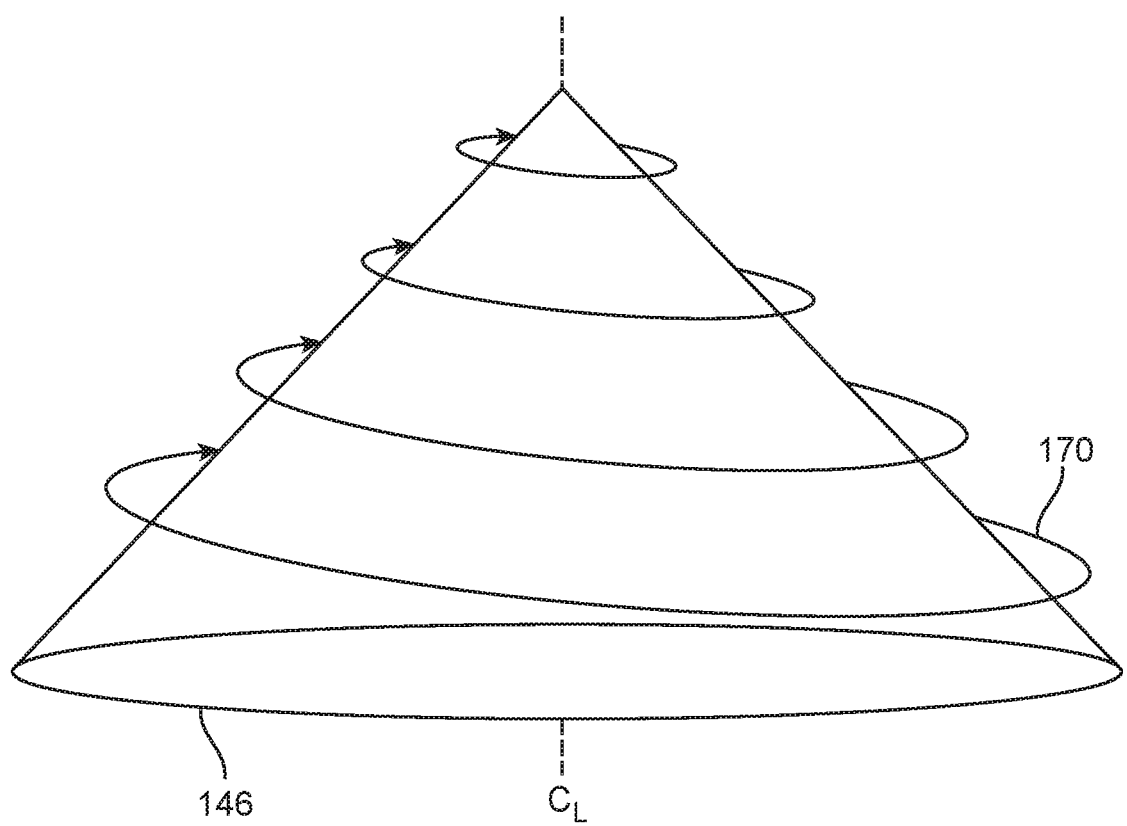
FIG. 8 is a schematic illustration of a swirl pattern of the fuel and air.

FIG. 7 is a top view of a diagram illustrating the back angle θ 164 of the air exit orifice. The back angle θ 164 is measured in a plane normal to the centerline $C_L$ and is the angle of the injected air referenced to a line between the air exiting orifices 120 and the centerline $C_L$. In other words, the back angle θ 164 is measured in a plane normal to the centerline $C_L$, and represents rotation toward the tangential flow direction. FIG. 8 depicts a schematic illustration of a swirl pattern 170 of the fuel and air in an embodiment.

Key features of embodiments disclosed herein include that the swirler reference line is generally perpendicular to the thin sheets of the fuel spray cone 146. Moreover, the electric motor 106 powering the axial compressor 114 are employed to pressurize the cavity.

Figure 9:
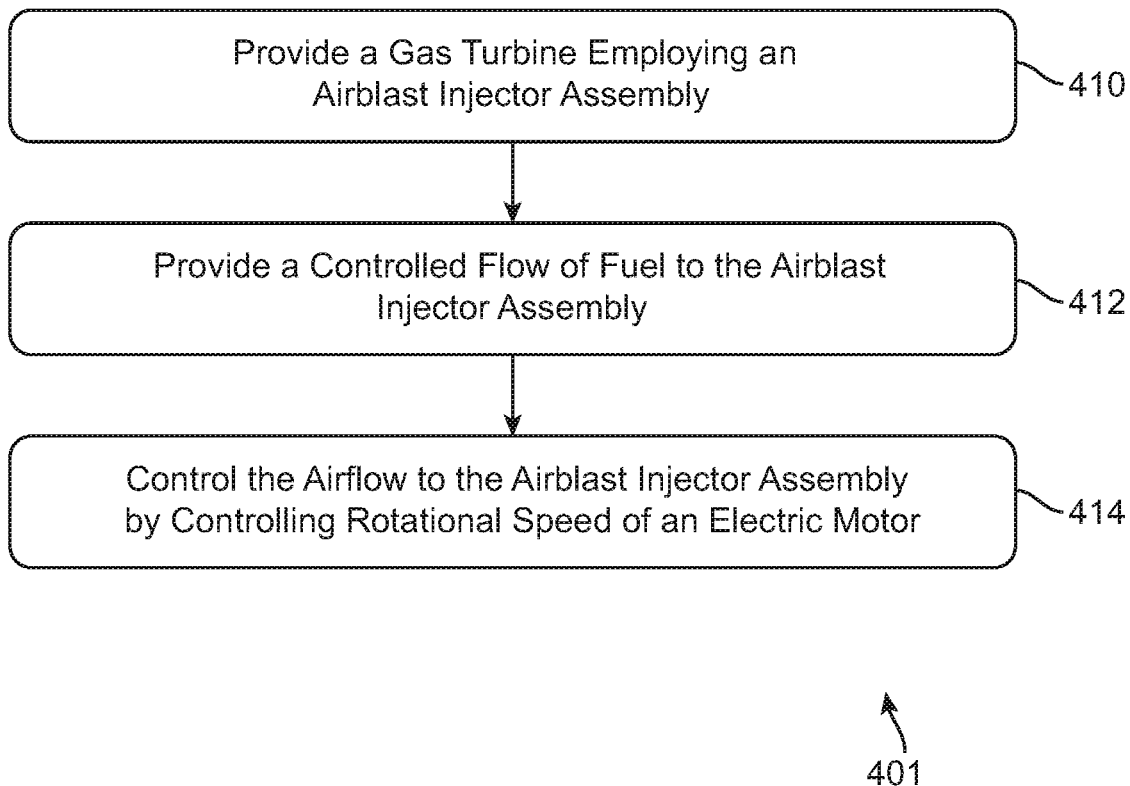
FIG. 9 is an exemplary flowchart illustrating a method for operating an electric motor-assisted airblast injector in a gas turbine engine.

FIG. 9 is an exemplary flowchart illustrating a method 401 for operating an electric motor assisted airblast injector on a gas turbine. A gas turbine employing an airblast injector assembly is provided (step 410). A controlled flow of fuel is provided to the airblast injector assembly (step 412). The airflow to the airblast injector assembly is controlled by controlling the rotational speed of an electric motor coupled to a compressor upstream of the airblast injector assembly.

Although the invention has been discussed with reference to specific embodiments, it is apparent and should be understood that the concept can be otherwise embodied to achieve the advantages discussed. The preferred embodiments above have been described primarily as electric motor assisted airblast injectors for gas turbines. In this regard, the foregoing description of the electric motor assisted airblast injectors is presented for purposes of illustration and description. It shall be apparent that various gas turbine engines may also benefit from the airblast injectors described herein.

Furthermore, the description is not intended to limit the invention to the form disclosed herein. Accordingly, variants and modifications consistent with the following teachings, skill, and knowledge of the relevant art, are within the scope of the present invention.

The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. An airblast injector assembly, comprising:
    a fuel swirler generating a fuel spray cone having a spray cone angle, the fuel swirler having an injector tip diameter, where said fuel swirler includes an inner tapered surface having a shape of a frustum of a cone with a cone angle equal to the spray cone angle;
    a swirler cup having an inner tapered surface having a shape of a frustum of a cone having a cone angle equal to the spray cone angle and positioned to accept the fuel spray cone from the fuel swirler adjacent to and at constant distance from the inner tapered surface of the swirler cup, where said swirler cup includes a plurality of air exiting orifices which accept a pressurized airstream and are positioned annularly around said inner surface at a swirler location diameter, the plurality of air exiting orifices directing said airstream towards the fuel spray cone, the plurality of air exiting orifices having a down angle and a back angle relative to a line that is perpendicular to said fuel spray cone;
    an outlet defining a fuel exiting orifice; and
    a combustor dome, the outlet defining the fuel exiting orifice connecting the fuel swirler to the combustor dome,
    wherein the swirler cup is positioned upstream from the combustor dome.

2. The airblast injector assembly of claim 1, wherein the plurality of air exiting orifices are positioned downstream and away from the fuel swirler, wherein a ratio of the swirler location diameter to the injector tip diameter is in the range of 1.5 to 3.0.

3. The airblast injector assembly of claim 1, wherein the down angle is in the range of 37.5 degrees to 52.5 degrees.

4. The airblast injector assembly of claim 1, wherein the back angle is in the range of 0 degrees to 75 degrees.

5. The airblast injector assembly of claim 1, wherein the spray cone angle is in the range of 75 degrees to 105 degrees.

6. The airblast injector assembly of claim 1, wherein said pressurized airstream is a controlled pressurized airstream.

7. The airblast injector assembly of claim 1, where the combustor dome has a shape of a frustum of a cone having a cone angle equal to the spray cone angle.

* * * * *